No. 607,627.  
J. REECE, Dec'd.  
M. REECE & F. A. SHEA, Administrators.  
MACHINE FOR CUTTING TEETH ON WORM TOOTHED GEARS.  
(Application filed Sept. 9, 1897.)  
Patented July 19, 1898.
(No Model.)  
2 Sheets—Sheet 1.
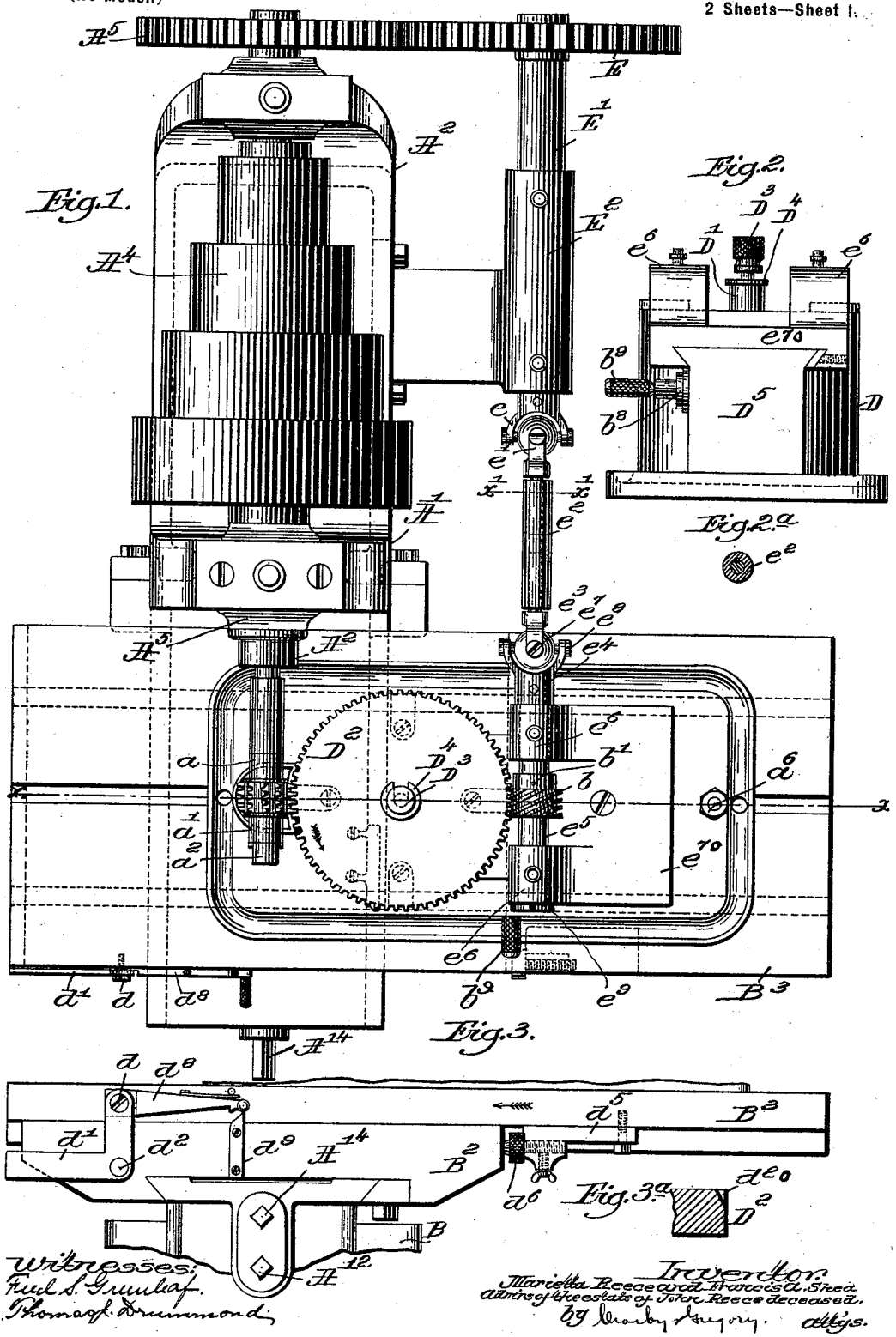

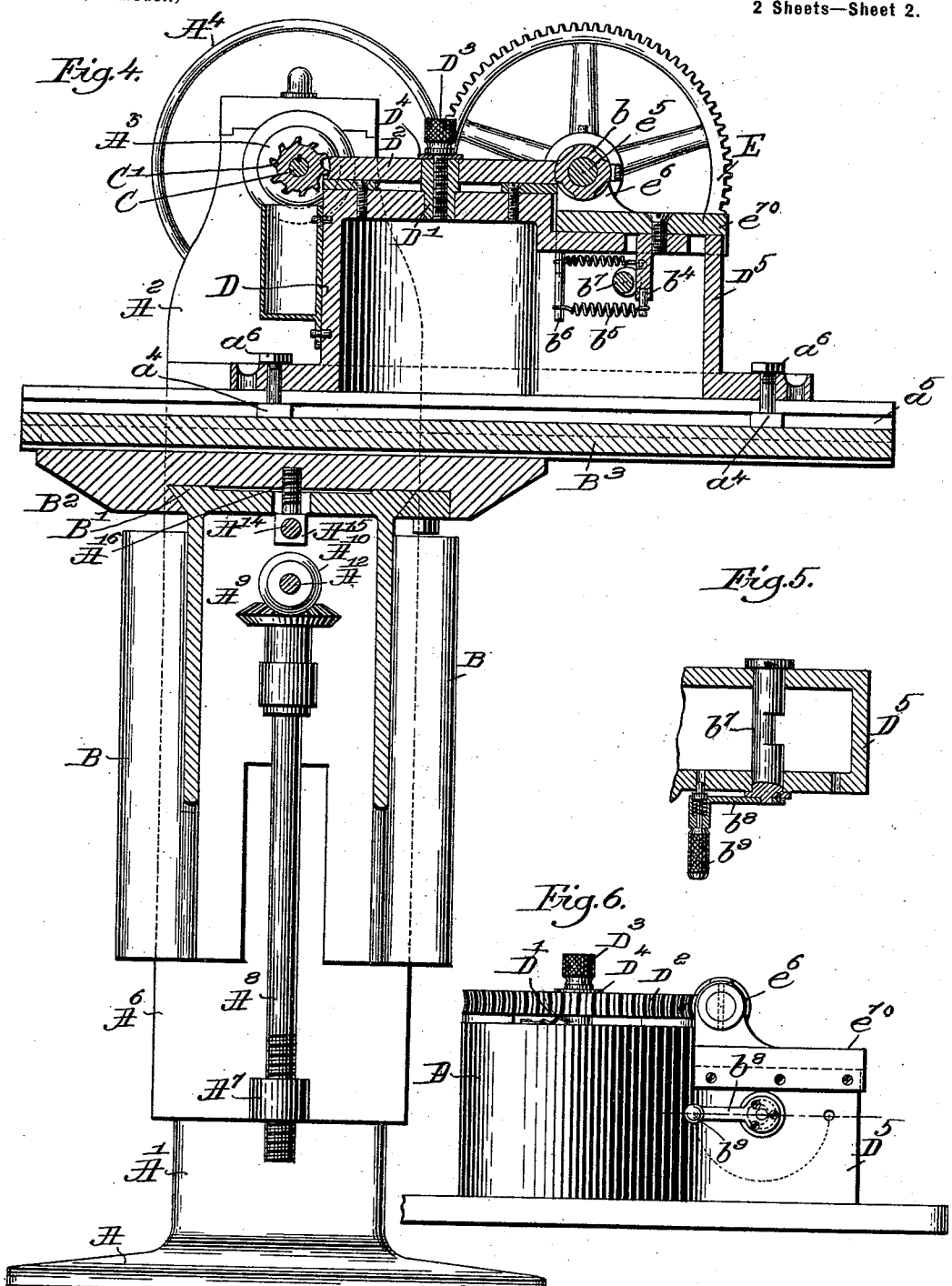

UNITED STATES PATENT OFFICE.

MARIETTA REECE AND FRANCIS A. SHEA, OF BROOKLINE, MASSACHUSETTS, ADMINISTRATORS OF JOHN REECE, DECEASED.

MACHINE FOR CUTTING TEETH ON WORM TOOTHED GEARS.

SPECIFICATION forming part of Letters Patent No. 607,627, dated July 19, 1898.

Application filed September 9, 1897. Serial No. 651,059. (No model.)

*To all whom it may concern:*

Be it known that JOHN REECE, deceased, late of Brookline, Massachusetts, invented an Improvement in Machines for Cutting Teeth on Worm Toothed Gears, of which the following description, in connection with the accompanying drawings, is a specification, like letters on the drawings representing like parts.

Prior to this invention the teeth of worm toothed gears have been cut singly, one succeeding the other, and great difficulty has been experienced in cutting the teeth of exactly the same size.

The machine to be herein described has been devised to cut and finish several worm-teeth at one and the same operation, the gear to be provided with teeth being rotated continuously at a proper speed by a pattern-worm the exact counterpart of the worm to be employed to engage and rotate the worm tooth gear, and prior to hobbing out the teeth the edge of the blank which when provided with teeth is to constitute the gear is gashed at uniform distances apart, the said gashes being entered by the projecting teeth of the pattern-worm.

Figure 1 is a top view of a machine for cutting the teeth of worm toothed gears embodying this invention; Fig. 2, a partial right-hand side view of the parts shown in Fig. 1 with the pattern-worm and the worm-gear omitted, the spindle carrying the pattern-worm having been withdrawn; Fig. 2$^a$, a section in the line $x'$, Fig. 1; Fig. 3, a partial end view of the machine shown in Fig. 1. Fig. 3$^a$ is a detail showing the gashed edge of the blank to be provided with worm-teeth; Fig. 4, a section in the line $x$, Fig. 1; Fig. 5, a detail to be referred to; Fig. 6, a detail of some of the parts broken off from the top of Fig. 3; Fig. 7, a detail showing the end of lever.

The foot A has an upright A', provided at its upper end with a yoke-like head A$^2$, which receives any usual bearing for the spindle-shaft A$^3$, to be discribed, said spindle-shaft having fast on it any usual or suitable nest of belt-pulleys A$^4$ and at its outer end a toothed pinion A$^5$.

The column A' has secured to it a guide-way A$^6$, having beveled or dovetailed edges to be embraced by a vertically-movable table B, the upper end or horizontal extension B' of said table being of dovetailed shape in cross-section (see Fig. 4) to receive and guide the part B$^2$ of the two-part carriage B$^2$ B$^3$, the part B$^3$ being adapted to be slid longitudinally in the part B$^2$, while the part B$^2$ is adapted to slide on the extension B' of the table. This table B must be raised and lowered in order that the work may be put in exactly the proper relation to the hob-cutter to be described, and to do this the guide A$^6$ has a threaded ear A$^7$, in which is entered the threaded end of a shaft A$^8$, having at its upper end a beveled pinion A$^9$, which is engaged by a beveled pinion A$^{10}$, fast on a short shaft A$^{12}$, the outer end of which (see Fig. 3) is squared to receive a suitable wrench or key by which to turn the said shaft A$^8$ with the shaft A$^{12}$, the rotation of the shaft A$^8$ in one or the other direction raising or lowering the table B.

The shaft A$^{12}$ has suitable bearings at the lower side of the extension B'. The extension B' has a second screw-shaft A$^{14}$, which enters a threaded nut A$^{15}$, extended downwardly from the part B$^2$ of the carriage, said nut being connected with said carriage by a screw-stud A$^{16}$, (see Fig. 4,) the rotation of the screw-shaft A$^{14}$ adjusting the two-part carriage B$^2$ B$^3$ on the extension B', this adjustment being necessary in order to place the center of the blank D$^2$ to be cut in proper relation to the hob.

The end of the spindle A$^3$ farthest from the gear A$^5$ is hollow and receives in it a tapered arbor C, and said arbor has splined upon it the hob-cutter C', the teeth of which are inclined and spirally arranged, so that the said cutter may be rotated continuously and cut worm-teeth in the continuously-moving blank D$^2$, thus forming a worm toothed gear. The hob-cutter is held in position between two collars $a$ and $a'$ on the tapered arbor, a removable nut $a^2$, screwed onto the threaded end of the arbor, acting against the collar $a'$.

The part B$^3$ of the table B$^2$ B$^3$ has adjustably secured upon it a stand D, the connection of the stand with the part B$^3$ being effected by the headed bolts $a^4$, placed in a groove $a^5$ of said part B$^3$, said bolts passing through suitable ears of the stand, where they have applied to them suitable nuts $a^6$, the loosening of said nuts enabling the stand to be adjusted properly on or with relation to the part $B^3$ of the table and the hob-cutter, according to the radius of the wheel to be provided with worm-teeth. This stand B has at its top a hollow post $D'$, over which is fitted to revolve the blank $D^2$ to be provided with worm-teeth to thus constitute a worm toothed gear, said blank being kept down properly on said post by means of a suitable set-screw $D^3$, said set-screw acting, preferably, upon a suitable washer $D^4$, interposed between it and the said post.

The gear $A^5$ engages a toothed gear E, fast on a shaft $E'$, having bearings in a stand $E^2$, extended from the column $A^7$. This shaft $E'$ is a short shaft and has fixed to its end the part $e$ of a universal joint, the other part $e'$ of said universal joint having its stem or shank splined into a short shaft $e^2$, the opposite end of said shaft being also splined with relation to the stem of a part $e^3$ of a second universal joint, the other coöperating part being designated $e^4$ and connected with a short shaft $e^5$, this latter shaft rotating in suitable bearings $e^6$ of a carriage $e^{70}$, mounted to slide (see Fig. 2) on the dovetailed guideway $D^5$, extended from the stand D. Fig. 2 shows the outer end of this stand with the said carriage upon it; but the shaft $e^5$ is removed, it being made removable in order that the pattern-worm $b$ may be applied to or taken off from the said shaft. To take out the shaft $e^5$, the operator will remove the screws $e^7$ $e^8$ of the universal joint $e^3$ $e^4$, turning the short shaft $e^2$ up and removing the nut $e^9$.

The hub of the pattern-worm is suitably pinned or fixed to the shaft $e^5$ by means of a pin $b'$ or in other usual manner.

The pattern-worm must be kept firmly seated in the first instance in the gashes formed in the edge of the blank $D^2$ to outline or position the teeth to be cut, said gashes being illustrated by the letter $d^{20}$ in Fig. $3^a$, said figure showing but part of the said blank.

To keep the pattern-worm $b$ in close engagement with the blank $D^2$, the carriage $e^7$ has extended from its under side into the stand D a suitable bracket $b^4$, which has connected to it suitable springs $b^5$, attached to a stationary stud or pin $b^6$, the bracket $b^4$ resting against an eccentric $b^7$, having a suitable handle, as $b^8$.

When the machine is started, the locking-pin $b^9$, connected with said handle, is removed, and the eccentric is turned into the position shown in Fig. 4, so that thereafter the springs $b^5$ may act freely to keep the pattern-worm pressed firmly against and into the gashes or into the teeth coinciding with said gashes, it being understood that the blank $D^2$ may be rotated a plurality of times during the operation of providing it with worm-teeth, so that said teeth are cut gradually, the pattern-worm driving the said blank $D^2$ at all times, so that the said worm-toothed gear when finished will correctly and accurately match with the worm-gear a duplicate of the pattern-worm $b'$.

In order that the part $B^3$ of the table $B^2$ $B^3$ may be moved in the proper direction to keep the blank $D^2$ in proper position to be cut by the teeth of the hob-cutter, the said cuts gradually growing deeper and deeper, the part $B^2$ is provided with a stud $d^2$, (see Fig. 3,) on which is mounted a lever $d'$, the outer end of said lever having mounted upon it a suitable adjustable weight $d^4$, the position of said weight on said lever regulating the pressure of the blank $D^2$ against the hob-cutter and the speed of cutting of the teeth. Of course the movement of the table part $B^3$ in the direction of the arrow on it in Fig. 3 must be regulated to correspond with the depth desired for the teeth, and to do this the said part $B^3$ has been provided with a suitable block or stud $d^5$, having an adjustable screw or stop $d^6$, which may be turned to meet the table part $B^2$ sooner or later, as may be desired. The lever $d'$ has pivoted upon its short arm by a stud $d$ a spring-controlled catch $d^8$, which engages a stud $d^9$, fixed on the part $B^2$ of the table, said catch operating to hold the table part $B^3$ in proper position to enable the pattern-worm and the blank to be changed, if desired. When the teeth in the blank have been cut to the proper depth, the bracket $b^4$ meets the eccentric $b^7$ and stops the further movement of the carriage $e^{70}$ by the spring $b^5$.

Having fully described the invention, what is claimed, and desired to be secured by Letters Patent, is—

1. In a machine for cutting spiral toothed gears, a rotatable shaft provided with a hob having its teeth arranged spirally, of a shaft provided with a pattern-worm, and a stud to center the blank to be provided with worm-teeth, said pattern-worm engaging the blank and being adapted to rotate said blank continuously while the hob in its rotation acts simultaneously on a number of said teeth to cut or shape them, substantially as described.

2. A rotatable shaft provided with a hob-cutter, a stand having a stud to receive and center the blank to be provided with worm-teeth, a carriage movably mounted near said stud, a rotatable shaft having its bearings in said carriage, and provided with a pattern-worm, and means acting normally to keep said pattern-worm pressed into the gashes or partially-cut teeth of the said blank, to operate, substantially as described.

3. The stand having a stud to receive a blank to be provided with worm-teeth, a movable carriage, a rotatable shaft having its bearings therein and carrying a pattern-worm to drive the said blank, combined with an eccentric to put the said pattern-worm out of engagement from the teeth of said blank, substantially as described.

4. The stand having a stud to receive a blank to be provided with worm-teeth, a movable carriage, a rotatable shaft having its bearings therein and carrying a pattern-worm to drive the said blank, combined with an eccentric to put the said pattern-worm out of engagement from the teeth of said blank, and a spring to keep said pattern-worm in engagement with the gashes or teeth of said blank, substantially as described.

5. A hob-cutter, means to rotate it, a table, said table and hob-cutter being relatively vertically movable, a stand adapted to carry a blank horizontally thereon to be cut across its edges to form the gear, a two-part carriage mounted on said table, one part thereof carrying said stand and being movable relatively to the other part thereof, and a pattern-worm to rotate the blank moving with said movable part of the carriage, substantially as described.

6. The vertically-movable table, the two-part carriage $B^2$, $B^3$, mounted thereon, the stand adapted to carry the blank to be cut to form the gear, a pattern-worm to rotate said gear, a hob-cutter, means to rotate it, and means to move the part $B^3$ of said table $B^2$, $B^3$, toward said hob-cutter, and means to adjust the position of the part $B^2$ of said carriage $B^2$, $B^3$, on the extension of said table, substantially as described.

In testimony whereof we have signed our names to this specification in the presence of two subscribing witnesses.

MARIETTA REECE,
FRANCIS A. SHEA,
*Administrators of John Reece, deceased.*

Witnesses:
GEORGE C. HILL,
FRANK L. CADY.